Patented May 13, 1952

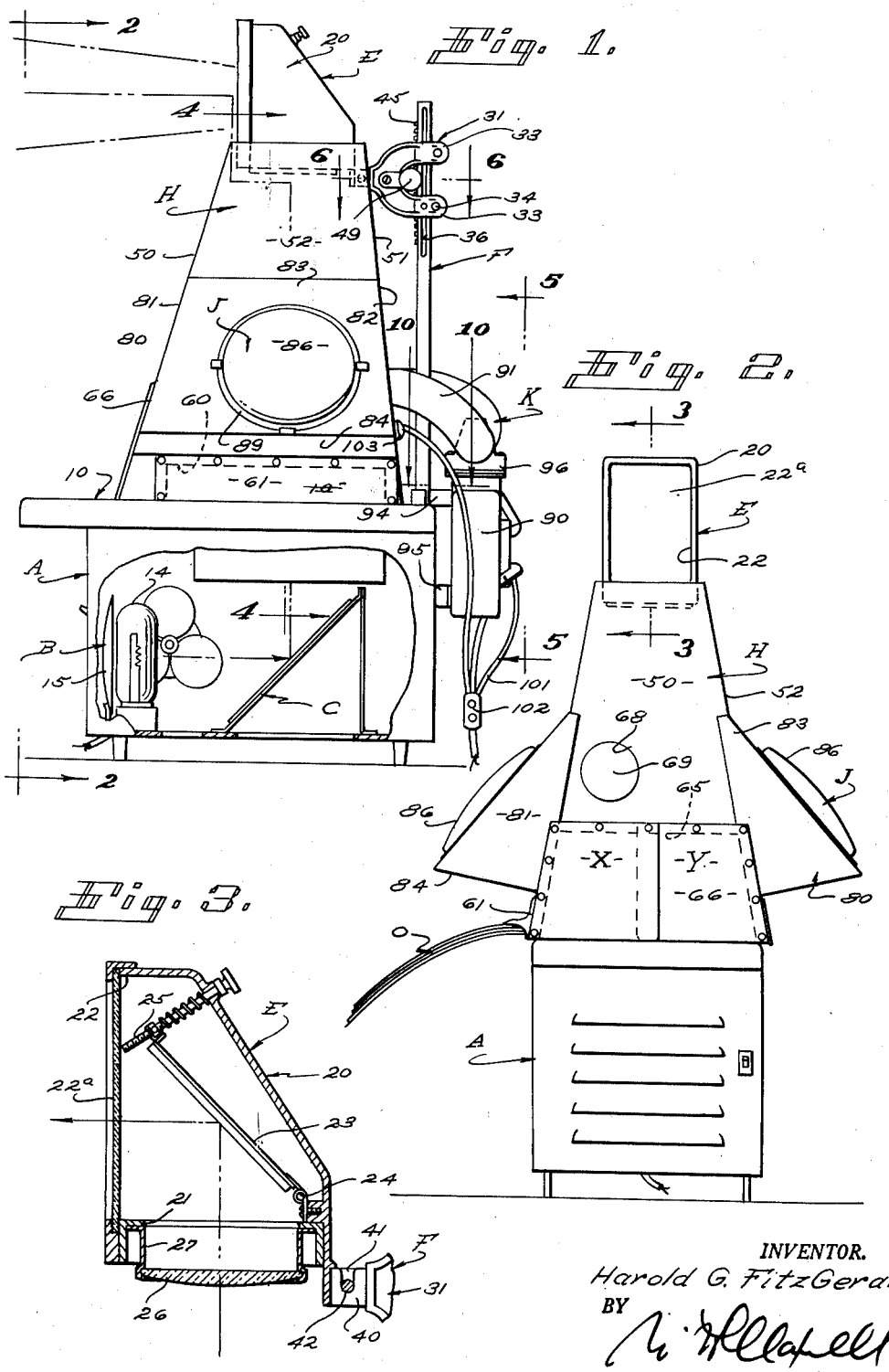

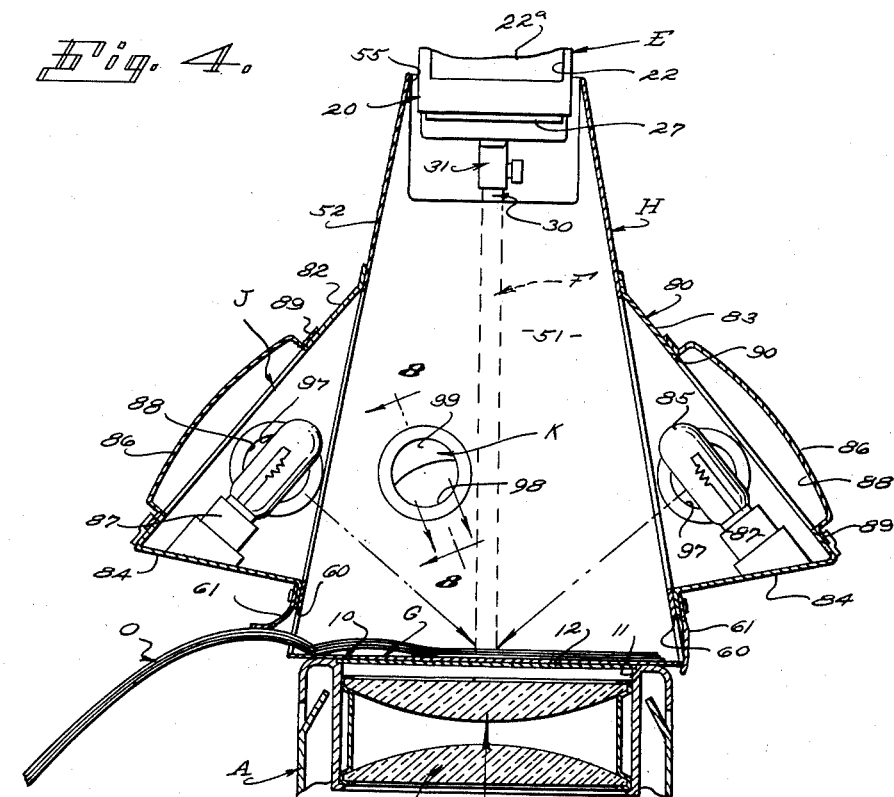
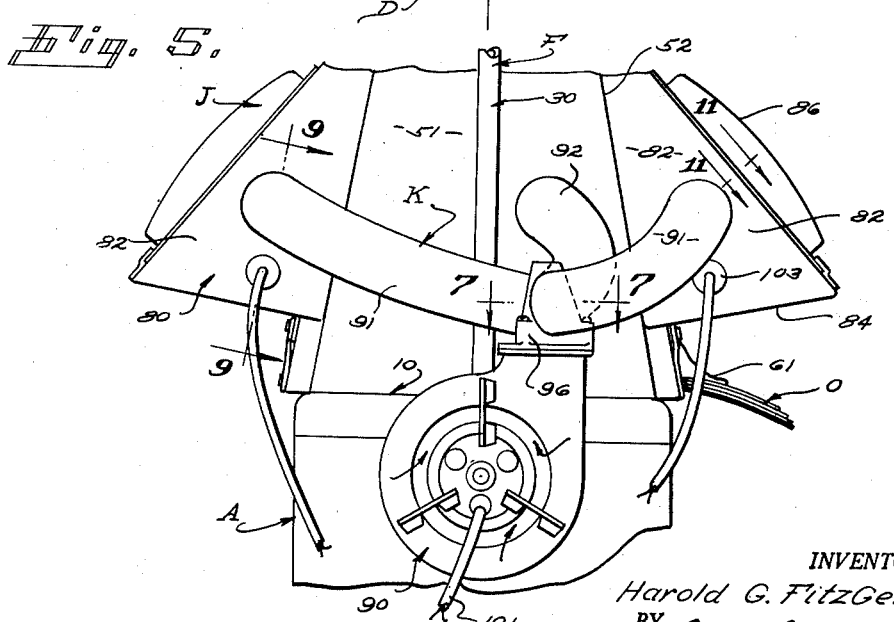
INVENTOR.
Harold G. FitzGerald
BY
Attorney

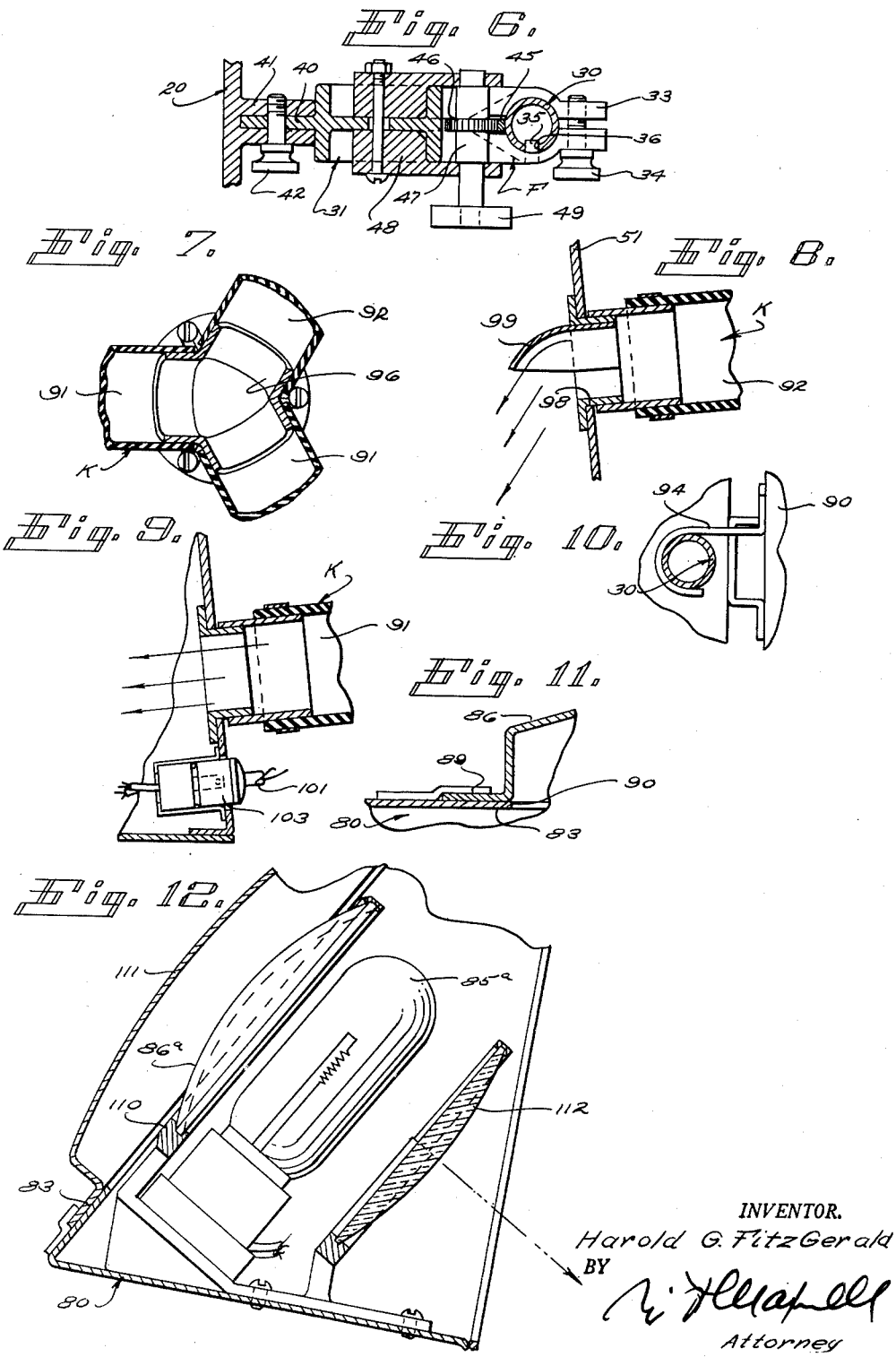

2,596,393

UNITED STATES PATENT OFFICE 2,596,393

ATTACHMENT FOR OPAQUE PROJECTION BY TRANSPARENCY PROJECTORS

Harold G. Fitz Gerald, Los Angeles, Calif.

Application May 23, 1949, Serial No. 94,913

1 Claim. (Cl. 88—26)

This invention has to do with an attachment for transparency projectors and it is a general object of the invention to provide a simple effective convenient structure applicable to a transparency projector to render it suitable for handling or projecting opaque subjects.

Transparency projectors are in general use and serve, generally, to direct light through a transparent film or the like and to project such transmitted light onto a screen. The general type of transparency projector to which the present invention is applicable involves a body having a top with a light opening and a light source is located in the body and directs a beam of light upwardly through the top of the body and through a transparency on the top of the body, there being a projector mounted above the body to receive the transmitted light and project it onto a screen.

It is a general object of this invention to provide an attachment applicable to a transparency projector of the general character referred to which is in the nature of an insert applicable between the body of the transparency projector and the projector head thereof, which insert carries or involves illuminating means serving to illuminate an object in the attachment so that reflected light is handled by the projector head.

It is another object of the invention to provide an attachment of the general character referred to which includes cooling means serving to circulate cooling air in the attachment so that an operator can manipulate an object in the attachment, or mark on or otherwise handle an object in the attachment without danger or inconvenience. The illuminating means included in the attachment involves one or more powerful lamps which in action generate a substantial amount of heat. However, the cooling means provided by the present invention so circulates cooling air in the attachment that the heat is dissipated and does not injure or curl objects being projected and does not detrimentally affect an operator's hand that may be arranged or maintained in the attachment.

It is another object of the invention to provide an attachment of the general character referred to which is such that it may be easily and quickly applied to the transparency projector and which does not require alteration or dismantling of the transparency projector either in the course of application or removal.

It is a further object of the present invention to provide a projector for opaque subjects applicable to a transparency projector to utilize parts thereof and which is of simple, inexpensive construction and at the same time simple, convenient and practical to use.

The various objects and features of my invention will be fully understood from the following detailed description of typical preferred forms and applications of the invention, throughout which description reference is made to the accompanying drawings, in which:

Fig. 1 is a side elevation of a transparency projector showing the attachment provided by the present invention applied thereto for handling opaque subjects, a part of the transparency projector being broken away to illustrate details thereof. Fig. 2 is a front view of the structure shown in Fig. 1, being a view taken as indicated by line 2—2 on Fig. 1. Fig. 3 is an enlarged detailed sectional view of the projector head of the transparency projector being a view taken as indicated by line 3—3 on Fig. 2. Fig. 4 is an enlarged detailed sectional view taken as indicated by line 4—4 on Fig. 1. Fig. 5 is an enlarged view of a part of the structure, being a view taken as indicated by line 5—5 on Fig. 1. Fig. 6 is an enlarged detailed plan section of a part of the structure, being a view taken as indicated by line 6—6 on Fig. 1. Fig. 7 is an enlarged detailed sectional view taken as indicated by line 7—7 on Fig. 5. Fig. 8 is an enlarged detailed sectional view taken as indicated by line 8—8 on Fig. 4. Fig. 9 is an enlarged detailed sectional view taken as indicated by line 9—9 on Fig. 5. Fig. 10 is an enlarged detailed sectional view taken as indicated by line 10—10 on Fig. 1. Fig. 11 is an enlarged detailed sectional view taken as indicated by line 11—11 on Fig. 5, and Fig. 12 is an enlarged detailed sectional view of a modified form of illuminating means that may be employed in carrying out the invention.

The attachment provided by the present invention is applicable, generally, to transparency projectors of the general type or character set forth in the above mentioned copending application and in the drawings I have illustrated it as being of such form and construction as to be specifically applicable to the particular transparency projector which is the subject of said application. It is to be understood that this particular application of the invention is set forth merely by way of example, and that in practice the invention may be carried out through various constructions or in various manners to accommodate or conform to various details that may be encountered in the particular transparency projector to which the attachment is to be applied.

The particular transparency projector illustrated in the drawings involves, generally, a body A which is a box-like structure having a flat top 10 with a light opening 11 closed by a transparent cover or top section 12. A light or illuminating means B is located in the body A and is shown as involving a lamp 14 and a reflector 15 located in the forward end portion of the body and serving to project a shaft of light toward the rear of the body. A reflector or mirror C is located in the body to receive the light from the light source B and direct it upwardly through the light opening 11 in the top 10 of the body. A suitable lens D is mounted in the body below and in register with the light opening 11 so that the light reflected by the mirror C is directed in a suitable beam or shaft upwardly through the transparent top section 12. A projector head E is carried by a suitable mounting means F so that it is spaced above and in vertical alignment with the light opening 11. When the structure is being used to project transparencies a transparency is located on the top 10 in register with the transparent section 12, and the light is directed up through the transparency to the projector head E.

The projector head E in the case illustrated involves a case 20 with a bottom light opening 21 through which light is admitted into the case. A forward or front light opening 22 is provided in the case and is preferably closed by a transparent cover 22ª. A suitable mirror or reflector 23 is provided in the case 20 so that light projected up through the opening 21 strikes the mirror and is reflected forward to fall upon a suitable screen or the like. In the case illustrated the mirror 23 is supported through a suitable pivot or hinge connection 24 and an adjusting screw 25 is provided so that the angle or pitch of the mirror 23 can be adjusted from the exterior of the case. A suitable lens 26 is carried in a holder 27 to cover or register with the light opening 21 so that light shining upward is handled by the lens directed through the opening 21 and falls upon mirror 23 to be directed forward through opening 22.

The mounting means F carrying the projector head E preferably involves a vertical post or standard 30 projecting upward from the body A at the rear thereof and a bracket 31 carried by the standard and supporting the head E through the case 20 thereof. In the particular case illustrated the bracket 31 has spaced arms 33 which are slidably engaged on the post 30. The arms are split and carry clamp screws 34 so that they can be set to grip the post and thus set the bracket in the desired position thereon. A pin 35 is carried by one of the arms 33 and operates in a longitudinal slot 36 in the post so that the bracket is held to project in the desired direction from the post.

In the form of the invention illustrated the bracket 31 has a forwardly projecting lug 40 received between spaced ears 41 projected from the case 20 of the projector head and a connecting screw 42 is provided to secure the lug 40 and ears 41 together so that the projector head is effectively secured to the bracket.

In practice means may be provided for operating the bracket vertically on the post 30 when the clamp screws 34 are released. In the drawings this operating means is shown as involving a rack 45 fixed on and extending longitudinally of the post 30, a pinion 46 carried by a shaft 47 and meshing with the rack and a mounting means 48 applied to the bracket and carrying the shaft. One end of the shaft projects from the mounting means 48 and carries an operating knob 49. With this construction rotation of the knob 49 causes operation of the pinion 46 which cooperates with the rack and causes vertical movement of the bracket 31. It will be apparent that in practice the structure just described may be constructed with enough friction so that the bracket will remain in an adjusted position without requiring operation of the clamp screws 34.

The attachment provided by the present invention is in the nature of an insert engageable between the body A and the projector head E of the structure above described. In the form of the invention illustrated the insert involves a base G, a hood H carried by and projecting upwardly from the base, illuminating means J carried by the hood and cooling means K related to the hood and serving to cool the interior thereof.

The base G of the attachment is preferably a simple flat plate and as shown in the drawings it may be so shaped and proportioned to rest upon the top 10 of body A so that it occupies a substantial portion of the top of the body and overlies the transparent section 12 to be in vertical register with the projector head E.

The hood H provided by the invention is preferably carried by or fixed to the base G and projects upwardly therefrom to form a housing-like construction extending from the body A to the projector head E, as clearly shown in the drawings. In practice and in accordance with the broader aspects of the invention the hood may vary widely in size, form, shape and construction.

In its preferred form the hood H forms an upwardly convergent structure or light shaft and is considerably larger at its lower end than at its upper end. In practice it is convenient to form the base G so that it is rectangular in plan configuration, in which case the lower end of the hood H is correspondingly shaped. In the particular case illustrated the hood H is polygonal or rectangular in cross section throughout its length and is formed of a flat front wall 50, flat back wall 51 and flat side walls 52. The several walls forming the hood are upwardly tapered or convergent and they cooperate, as shown in the drawings, to form an upwardly tapered or convergent duct through which light is effectively passed from the base to the projector head E which occurs at the upper end of the hood.

In the preferred form of the invention the upper end of the hood is shaped to substantially correspond with the shape of the projector head and the projector head may be related to the upper end of the hood to enter somewhat into the hood, as shown throughout the drawings. It is preferred to proportion the upper end of the hood and the projector head so that there is a space or passage 55 between these parts to allow for the escape of air from the hood, as the cooling means K operates.

In accordance with the present invention the hood is provided with one or more access openings 60 by which work or an object O may be arranged in the hood H to be carried on the base G. In the particular case illustrated there are two access openings 60 one in each of the sides 52 of the hood, and these openings are horizontally disposed slotlike openings located at the lower ends of the sides or where the sides join the base.

In accordance with the invention suitable closures 61 are provided for the access openings and in practice the closures may be flexible flaps of suitable fabric, or the like, joined at the sides 52 immediately above the openings 62 so that they normally depend to hang over and cover the openings.

The invention further provides a hand hole 65 in the hood H and in the preferred arrangement the hand hole 65 is located in the front 50 of the hood and like the openings 60 it is located at the lower end of the hood to be adjacent the base G, as shown in the drawings.

A suitable closure 66 is provided for the hand hole 65. In practice the closure may be in the nature of a flexible flap or curtain-like construction formed of one or more sections of flexible material, such as suitable cloth or the like, and the parts of the closure may be secured to the front 50 of the hood immediately above the opening 65 so that they normally hang or depend in such manner as to cover the opening. By providing the closure 66 in overlapping sections X and Y, as shown in Fig. 2, the hand of the operator can be conveniently passed between the closure sections and into the hood to handle or act upon an object O in the hood.

The invention further provides the hood H with a sight opening 68 which enables the operator to view the interior of the hood and more specifically an object O located on the base G. In the preferred form of the invention the sight opening 68 is located in the front 50 of the hood and it is provided with a transparent cover 69, preferably in the form of a light filter which suitably cuts out a certain amount of the light that would otherwise issue from the opening 68 while at the same time it allows the operator a full and proper view of the object O located on the base G.

The illuminating means J provided by the present invention preferably involves a plurality of light sources located in the hood H and preferably carried by the hood. The light sources are so located as to effectively illuminate an object O on the base G in such manner as to leave the object free of shadows even when an operator is indicating or marking on the object as in the course of explaining or demonstrating with reference to the object.

In the preferred form of the invention there are two units of the means J and these are located at the sides 52 of the hood H to be within the hood. In the preferred form of the invention, as illustrated, the units J are carried by the sides of the hood and each side 52 of the hood H is provided with an outward lateral extension or projection 80 having front and rear sides 81 and 82, respectively, which are, in effect, continuations of the front and rear sides 50 and 51 of the hood, respectively. Each extension 80 also has a top 83 carried by and extending between the sides 81 and 82, which top is pitched or inclined to be in a plane normal to a line extended from the center of the base G and substantially through the center of the extension 80. The extension is further provided with a bottom 84 as clearly shown in Fig. 4 of the drawings.

In the form of the invention illustrated in Figs. 1 to 11, inclusive, each unit of the illuminating means includes a lamp 85 and a reflector 86 which elements are related to and preferably carried by an extension 80 of the hood. In the preferred arrangement the lamp of each unit is carried in a socket 87 provided on the botom 84 of the extension 80 while the reflector 86 is a concavo-convex element with its concave side 88 faced inwardly and having a marginal flange 89 by which it is secured to the top 83 of the extension 80 to be in register with an opening 90 provided in the top.

Through the arrangement described light from the lamp 85 shines directly onto the base G or to an object on the base G and light from the lamp is caught by the reflector 86 and is directed onto the base G or an object located thereon. By providing extensions 80 at both sides of the hood H and by locating lamps and reflectors in connection with the extensions 80, as illustrated in Fig. 4, the base or an object on the base is effectively illuminated without in any way obstructing free passage or reflection of light upward from the base or an object on the base to the projection head E at the upper end of the hood.

The cooling means K provided by the present invention is shown as involving, generally, a motor driven blower 90 located at the exterior of the parts hereinabove described and distributor ducts 91 and 92 handling air from the blower and discharging it into the hood in a most advantageous manner.

The motor driven blower 90 is preferably located at the rear end of the body A and in the case illustrated it is detachably connected with the transparency projector by means of a hook-like bracket 94 and a brace 95. The hook-like bracket 94 engages around the post or standard 30 of mounting means F while the brace 95 bears against the rear end of the body A.

In the particular case illustrated the blower 99 delivers air to a header or manifold 96 and the ducts 91 and 92 are connected to and extend from the manifold 96. There are two ducts 91 extending from manifold 96 to the extensions 80 of the hood and they open into the extensions 80 of the hood through ports 97 in the rear walls 82 of the hood extensions. The ports 97 are preferably so located that air passed through them from the blower impinges upon the lamps 85 located in the hood extensions 80 and thus serves to effectively cool the lamps and the parts adjacent thereto.

The duct 92 extends from the manifold 96 to the back 51 of the hood H where it connects with a port 98 in the back 51 which port is equipped with a baffle 99 serving to direct the air passed between port 98 downwardly and onto the center portion of the base G to effectively cool the base G or an object thereon or the hand of an operator that may be in the hood H manipulating, handling, or operating an object in the hood.

In practice the several ducts of the means K may be flexible elements or hoses which give the attachment suitable freedom of manipulation and it is preferred that flexible electric cables 101 be extended from a control switch 102 to extend to the motor driven blower 90 and to the sockets 87 of the lamps in a manner such as is illustrated in the drawings. In such an arrangement the cables may be connected to the sockets through detachable plug connections 103 and the cables may be extended so that the switch 102 can, in practice, be located at a point most convenient to the operator.

In the form of the invention illustrated in Fig. 12 of the drawings the illuminating means provides a structure somewhat different than that hereinabove described. In this second form of construction a reflector 86$^a$ is provided immediately behind the lamp 85$^a$ and is carried by a mounting 110 so that it is entirely independent of parts of the hood extension 80. In this case the top 83 of the hood extension is provided with a cap or dome-shaped cover 111 which is spaced from the reflector 86ᵃ. A suitable lens 112 is provided in front of the lamp 85ᵃ serving to concentrate light from the lamp on the base G or on an object O on the base G.

From the foregoing description it will be apparent how the transparency projector may be operated in the manner originally intended for this construction until such time as it is desired to project an opaque object, whereupon the attachment provided by the present invention may be applied to the transparency projector by inserting the hood between the body A and the projector head E, arranging the motor driven blower at the exterior of the structure and suitably connecting the lines 101 through which the blower and lamps are energized. With the attachment in place the control switch 102 is closed causing the lamps to burn and the blower to operate. Under such condition the base G or an object O on the base G is brilliantly illuminated by the light from the lamps and light reflected upward therefrom received by the projector head.

The projector head can be conveniently adjusted to handle such light so that it is projected in the desired manner onto a screen or the like. In the course of using the attachment the operator can pass objects into and out of the attachment through the access openings 60 and the operator's hand can be inserted into the hood or even maintained therein, as conditions may require, by inserting the hand through the hand hole 65. Since the cooling means operates constantly air circulates within the hood preventing excessive temperatures from developing therein and objects on the base G are not injured by heat and an operator is not inconvenienced by placing or maintaining his hand in the hood. To reestablish the transparency projector in its original condition it is merely necessary to remove or dislodge the parts of the attachment, all of which leaves the transparency projector in its original state and ready for operation as originally intended.

Having described only typical preferred forms and applications of my invention I do not wish to be limited or restricted to the specific details herein set forth, but wish to reserve to myself any variations or modifications that may appear to those skilled in the art and fall within the scope of the following claims.

Having described my invention, I claim:

An attachment for a transparency projector having a box-like body with a light passing opening in the top and a post projecting up from the body and supporting a light projecting head spaced above the opening including, a base applicable to the top of the body to rest thereon, a hood carried by the base projecting upward therefrom to the head and including a back, a front with a hand hole therein and sides with access openings therein, flexible closures carried by the hood normally closing the hole and opening, illuminating means carried by the hood directing light to illuminate an object on the base so reflected light therefrom passes to the head, and cooling means delivering cooling air into the hood including a motor driven blower carried by one side of the body and ducts delivering air from the blower to the hood through the back thereof and onto the illuminating means.

HAROLD G. FITZ GERALD.

REFERENCES CITED

The following references are of record in the file of this patent:

UNITED STATES PATENTS

| Number | Name | Date |
|---|---|---|
| 658,255 | Fulgora | Sept. 18, 1900 |
| 1,111,090 | Patterson | Sept. 22, 1914 |
| 1,202,754 | Patterson | Oct. 24, 1916 |
| 1,687,946 | Massiot | Oct. 16, 1928 |
| 1,841,063 | Semenitz | Jan. 12, 1932 |
| 2,029,871 | Johnson | Feb. 4, 1936 |
| 2,273,936 | Caroni | Feb. 24, 1942 |

FOREIGN PATENTS

| Number | Country | Date |
|---|---|---|
| 505 | Great Britain | of 1912 |
| 276,961 | Germany | July 23, 1914 |
| 453,142 | Germany | Nov. 29, 1927 |